United States Patent [19]

Weibye

[11] Patent Number: 4,614,660
[45] Date of Patent: Sep. 30, 1986

[54] PROCESS FOR PRODUCING QUICK COOKING VEGETABLES

[75] Inventor: Bjarne Weibye, Oslo, Norway

[73] Assignee: Apothekernes Laboratorium A.S., Oslo, Norway

[21] Appl. No.: 707,181

[22] Filed: Mar. 1, 1985

Related U.S. Application Data

[63] Continuation of Ser. No. 414,140, Sep. 2, 1982, abandoned, which is a continuation-in-part of Ser. No. 298,676, Sep. 2, 1981, Pat. No. 4,385,074.

[51] Int. Cl.[4] ............................ A23L 1/20; A23B 7/02
[52] U.S. Cl. .................................... 426/461; 426/508; 426/511; 426/634
[58] Field of Search ............... 426/618, 634, 629, 640, 426/615, 637, 459, 460, 461, 462, 507, 508, 511, 465

[56] References Cited

U.S. PATENT DOCUMENTS

3,083,102  3/1963  Carcassonne-Leduc ........... 426/461
3,388,998  6/1968  Ozai-Durrani ..................... 426/445
4,273,796  6/1981  Maxcy et al. ...................... 426/634

Primary Examiner—George Yeung
Attorney, Agent, or Firm—Seidel, Gonda, Goldhammer & Abbott

[57] ABSTRACT

A continuous process for producing a quick cooking vegetable comprising the steps of spraying moisture and steam on discrete pieces of a vegetable as the vegetable moves along on a conveyor belt until the vegetable attains a moisture content of between about 50 weight percent and about 97 weight percent and a resultant temperature of between about 72° C. and about 110° C. such that the vegetable pieces are completely gelatinized; pre-drying the vegetable pieces by hot air at velocities ranging between about 100 m/s and about 140 m/s to a moisture content of between about 20 weight percent and about 30 weight percent; and finally drying the vegetable pieces by hot air at velocities ranging between about 75 m/s and about 110 m/s to a final moisture content between about 5 weight percent and about 15 weight percent.

6 Claims, 4 Drawing Figures

PROCESS FOR PRODUCING QUICK COOKING VEGETABLES

CROSS-REFERENCE TO RELATED APPLICATION

This application is a continuation of application Ser. No. 414,140, filed Sept. 2, 1982, now abandoned, which is a continuation-in-part application of my co-pending patent application Ser. No. 298,676, filed Sept. 2, 1981, now Pat. No. 4,385,074.

BACKGROUND OF THE INVENTION

This invention relates to a continuous process and apparatus for producing quick cooking (instant) rice and vegetables. Rice or vegetables produced in accordance with the present invention would require only above five minutes contact in hot, not necessarily boiling, water for swelling to make the rice or vegetables suitable for consumption, while retaining most of the nutritional value in the rice or vegetables.

Standard milled white rice and vegetables, such as potatoes, carrots, peas, corn and the like generally require about 20 to 35 minutes of cooking in boiling water before consumption. In addition to the long cooking time required for rice and these vegetables, the starch in rice and some of these vegetables is sometimes not entirely gelatinized. In the case of rice and some conventionally prepared vegetables, an undue number of the starch cells in the rice or vegetable may burst to form a viscous, sticky, pasty cooked mass. For these reasons and others, the consumption of rice and certain vegetables has been restricted for many years. Accordingly, considerable effort has been directed towards the production of quick cooking rice and vegetables.

Generally, "quick cooking rice" has been defined as rice that has been hydrated and/or gelatinized to various degrees and dried in such a manner to produce individual kernels for subsequent cooking in boiling or hot water for a short period of time.

An excellent discussion of quick cooking rice is given in RICE CHEMISTRY AND TECHNOLOGY edited by D. F. Houston, published by the American Association of Cereal Chemists, Incorporated, St. Paul, Minn., Chapter 15, *Quick Cooking Rice*, Robert L. Roberts, pages 381–399.

Generally most prior art methods of making quick cooking rice involve soaking in the rice in water. For example, see U.S. Pat. Nos. 2,438,939; 2,733,147; 2,740,719; and 2,828,209. The soaking technique, however, is time consuming, involves a loss of valuable rice starch and produces a waste water pollution problem. Soaking involves the use of excess water which invariably leads to a dissolving of rice starch into the water which not only lowers the nutritional value of the rice (loss of carbohydrates and calories), but also results in the production of a starchy water effluent which must be disposed.

Another technique used in producing quick cooking rice involves fissuring the rice and such method is disclosed in various patents including U.S. Pat. No. 3,157,514 and Norwegian Pat. No. 107,170. U.S. Pat. No. 3,157,514 suffers from the fact that it specifically requires hydrated rice to be used as a raw starting material. Further, U.S. Pat. No. 3,157,514 involves the soaking technique and cooling the rice before drying (a very energy wasteful step). The rice product of U.S. Pat. No. 3,157,514 is not completely gelatinized and thus requires boiling to render the rice suitable for consumption. Th rice produced by the method of Norwegian Pat. No. 107,170 is also not completely gelatinized and thus requires boiling in water before consumption.

Still another process to produce quick cooking rice is given in U.S. Pat. No. 2,937,946 which discloses the use of spraying with hot water to gelatinize the rice. This technique requires large amounts of hot water and is thus very energy consuming. Also, the process of U.S. Pat. No. 2,937,946 involves a great deal of time to achieve gelatinization.

Although less attention has been focused on the preparation of quick-cooking vegetables, there has been some progress in this field.

Several patents describe processes for pre-cooking potatoes. Exemplary of these patents are German Pat. Nos. 743,714 and 833,441; and German Offenlegungsschrifts Nos. 1,946,129 published Oct. 1, 1970 and 2,856,764 published July 12, 1979; Swiss Pat. No. 590,617; Norwegian Pat. No. 134,683; United Kingdom Pat. No. 2,008,383; and U.S. Pat. Nos. 3,038,813; 3,410,702 and 3,635,729. The soaking of peas and beans in water prior to cooking is described in U.S. Pat. Nos. 1,813,268; 1,859,279; 3,291,615 and 3,388,998.

The drying of gelatinized rice and vegetables usually places a great strain on the rice or vegetable resulting in the deterioration of its cell walls. The more times rice or the vegetable is dried, the more cell walls are destroyed. The result is that the rice or vegetable loses its capacity to reconstitute and reshape to its original form when soaked in water. Experience shows that for rice and vegetables that are dried several times, the ability to reconstitute is reduced by 40% to 60%. On the other hand, for rice and vegetables which have been dried only once, the ability to absorb water and reshape is reduced only by 5% to 10%. It is therefore important to find a method that provides suitable water absorptivity for sufficiently dried rice and vegetables.

DEFINITIONS

"Completely gelatinized" as referred to herein means the condition of rice or a vegetable when all of the starch in the rice or vegetable is completely softened and all of the starch in the rice or vegetable is converted in such a manner that the rice or vegetable swells in hot water.

"Cycle" as referred to herein is one water spray followed by one steam spray.

"Discrete pieces" as referred to herein means vegetables in individual, distinct (separate) pieces having a certain size and shape as opposed to mashed vegetables. A discrete piece of potato, for example, would be a slice or cube of potato. No particular shape is necessary.

"Gelatinization" as referred to herein means the condition of rice or a vegetable after it has been treated at a certain temperature in a sufficient amount of moisture such that the starch in the rice or vegetable is softened, structurally broken down and converted in such a manner that the rice or vegetable swells in hot water.

"Moisture" as referred to herein is water, steam or a mixture of water and steam.

"Moisture content" as referred to herein and expressed as a weight percentage is the weight percent of moisture with respect to the total weight of the dry vegetable plus the weight of moisture contained in the vegetable.

"Steam" or "dry steam" as referred to herein is water vapor (in the gaseous phase) which does not contain any particles of water. Steam (dry steam) will experience a rise in temperature when exposed to an increase in heat. Steam which contains water particles is referred to herein as "wet steam".

"Vegetable" as referred to herein means corn and the edible part of any herbaceous plant. The term "vegetable" includes, but is not limited to leaves such as spinach, cabbage and collards; seeds such as peas, beans and corn; roots such as carrots, beets and turnips; pods such as string beans and okra; tubers such as potatoes; stems such as celery; bulbs such as onions; shoots such as asparagus; sprouts and stalks such as broccoli; and flower clusters such as cauliflower.

"Water" as referred to herein is water in the liquid phase and does not include water in the gaseous phase, i.e., steam.

SUMMARY OF THE INVENTION

There has now been discovered a process to prepare a quick cooking rice or vegetable in which most of the carbohydrate and nutritional value is retained and in which the structural integrity of the rice or vegetable is maintained. Depending on the nature of the rice or vegetable utilized, the rice or vegetable product made by this new process will have a starch content which is 15% to 20% higher than a corresponding rice or vegetable product made by conventional batch processes. The rice and vegetables prepared by this novel process can be cooked in about three to five minutes by swelling in hot water. The novel process of this invention is also economical, saves energy, saves time, and produces a minimum of starchy pollutant effluents. This process can also be conducted in a closed chamber, thus avoiding undue contamination of the area in which the rice or vegetable is processed.

The continuous process of the present invention when applied to rice involves the spraying of rice with water and steam, such that the rice is completely gelatinized and attains a moisture content of between about 24 weight percent and about 78 weight percent with a resultant temperature for the gelatinized rice of between about 79° C. and about 100° C. The gelatinized rice is then dried to attain a final moisture content of between about 10 weight percent and about 14 weight percent, with the rice not being agitated to the extent where the rice forms a sticky mass.

The continuous process of the present invention when applied to vegetables involves the spraying of moisture on discrete pieces of a vegetable that contains carbohydrates that can be broken down. If dried vegetables are used, both water and steam are sprayed on the vegetables. If fresh vegetables are utilized, only steam spraying need be employed. The vegetable is sprayed until it attains a moisture content of between about 50 weight percent and about 97 weight percent and a resultant temperature of between about 72° C. and about 110° C. such that the vegetable pieces are completely gelatinized. The gelatinized vegetable pieces are then dried to attain a final moisture content of between about 5 weight percent and about 15 weight percent.

For some vegetables, such as very starchy vegetables, it is preferred to avoid agitating the vegetable during spraying to avoid the formation of a sticky mass of vegetable pieces.

The present invention also concerns an apparatus for producing quick cooking rice or vegetables. The apparatus includes a selectively closable chamber. A porous conveyor belt is disposed within the chamber for supporting rice or vegetable pieces. At least one set of nozzles is provided. Each set of nozzles is composed of a water nozzle adjacent a steam nozzle. The nozzles spray water and steam onto the rice or vegetable pieces contained on the conveyor belt. Means are provided for drying the sprayed rice or vegetable pieces.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

When rice is processed according to the present invention, dehulled rice is used. Non-limiting examples of rice that can be utilized in this invention include white rice, brown rice, long grain rice, medium grain rice, short grain rice and parboiled rice.

Although untreated rice can be utilized in the process of this invention, i.e., ordinary dehulled unpreheated rice, it is preferable to use fissured (finely cracked) rice grains. Without wishing to be bound by any particular theory of operability, it is believed that fissuring or causing fine cracks in the rice causes liquid to penetrate the grains quickly. The preferred method of obtaining this fissuring is by preheating the rice. This preheating is preferentially accomplished by contacting the rice with a hot gas, for example, air, oxygen, nitrogen, etc. The extent of preheating to achieve fissuring depends on the rice quality, for example, its starch content. The appropriate amount of preheating to achieve fissuring is empirical and must be determined experimentally. Generally, the temperature of preheating is between about 110° C. and about 150° C., and preferentially, between about 130° C. and about 140° C. The duration of preheating is between about 10 minutes and about 15 minutes, and preferentially between about 11 minutes and about 13 minutes.

Vegetables contain different groups and qualities of carbohydrates, from high molecular weight compounds to low molecular weight compounds. The process of this invention is particularly directed to softening the starchy component of the vegetables; breaking down the higher molecular weight carbohydrates in vegetables to compounds of lower molecular weight and converting vegetables in such a manner that the treated vegetables will swell in hot water.

Without wishing to be bound by any particular theory, it is believed that the breaking down of the higher molecular weight carbohydrates is achieved by activating the natural enzymes present in the raw vegetables by applying a certain amount of moisture and heat. The enzymes will then be broken down and disappear, but the process that is initiated may continue by further addition of heat. The starch that is formed in the process may gelatinize because of the influence of the moisture and heat.

Exemplary of the vegetables that can be utilized in the present invention include peeled potatoes, carrots, peas, corn, cauliflower, celery, beans, parsley, cabbage, leek and rutabaga (sweed). With potatoes, it is preferred to use fresh potatoes rather than pre-dried potatoes. Similarly, fresh carrots are preferred for use over dried carrots. Dried peas can be utilized in the same manner as fresh peas, but it is preferred that the dried peas be soaked in water for several hours prior to processing. It is preferred to use fresh corn rather than dried corn in this invention.

The vegetables treated according to the process of this invention are in discrete pieces. Mashed vegetables are not employed. Throughout the method of this invention, the structural integrity, i.e., shape and size, of the vegetable pieces generally remain intact.

For most vegetables, a size of 10 mm×10 mm×10 mm is generally acceptable for most purposes, whereas 10 mm×10 mm×30 mm, or 10 mm×10 mm×60 mm are the most preferred sizes for potatoes. It is mainly the cross-sectional area of the pieces that is the most important factor, as far as the processing time is concerned. Generally, a cross-sectional area of about 100 mm$^2$ is preferred. Vegetable pieces having cross-sectional areas greater than 100 mm$^2$ generally require long treatment times and consequently more energy is consumed during processing.

The length of the pieces may be varied within wide limits such as between about 3 mm and about 100 mm. The length of the piece will generally be dictated by the dimension most convenient for cooking and serving. In many instances, a length of about 60 mm is preferred.

The shape of the pieces would depend on the particular vegetable employed. Peas, for example, could be used in their natural state when removed from the pod and corn can be used directly as kernels removed from the corn cob Potatoes and carrots, on the other hand, would require cutting or slicing into fragments. Vegetables such as potatoes and carrots can be cut into any convenient shape such as a square cut or a cylindrical cut.

Generally, it is not required to fissure (to cause cracks in) the raw vegetables prior to processing them in accordance with the present invention.

The raw vegetables utilized in the present invention preferably are all naturally grown and thus the carbohydrate, protein, and water contents of a particular vegetable may vary according to the place of growing, quality of the vegetable itself, weather conditions during growing, etc. Thus the amount of moisture content attained during complete gelatinization may vary to some extent both for different kinds of vegetables and even for different vegetables of the same kind.

The rice, either untreated or preheated, or vegetable pieces are completely gelatinized and a certain predetermined moisture content is imparted thereto by intermittently spraying the rice or vegetable pieces with water and steam. If preheated rice is used, such rice is sprayed while it is still hot.

A controlled amount of water and steam is utilized during spraying in order to completely gelatinize the rice or vegetable pieces.

The moisture content of the rice at complete gelatinization is between about 24 weight percent and about 78 weight percent. It is preferred to achieve a moisture content of between about 52 weight percent and about 73 weight percent, and more preferably to achieve a moisture content of between about 68 weight percent and about 71 weight percent.

This moisture content of the vegetable at complete gelatinization is between about 50 weight percent and about 97 weight percent. It is preferred to achieve a moisture content of between about 65 weight percent and about 95 weight percent and more preferred to achieve a moisture content of between about 78 weight percent and about 93 weight percent.

The resultant temperature for the completely gelatinized rice is between about 79° C. and about 100° C. It is preferred to attain a resultant temperature of the gelatinized rice of between about 87° C. and about 95° C., and more preferred to achieve a resultant temperature of between about 90° C. and about 93° C.

The resultant temperature for the completely gelatinized vegetable is between about 72° C. and about 110° C. It is preferred to attain a resultant temperature of the gelatinized vegetable of between about 80° C. and about 105° C., and more preferred to achieve a resultant temperature between about 85° C. and about 100° C.

The spraying of water and steam onto the rice or vegetable pieces can be performed at once using wet steam, or with one or more cycles of sprays of water and steam (a cycle consists of one spray of water and one spray of steam) either alternately or simultaneously, with alternate spraying preferred. For rice, each individual spray of water lasts between about 5 seconds and about 40 seconds, preferably between about 10 seconds and about 40 seconds. The temperature of the water utilized is not crucial (it may be hot or cold) and can be ambient, for example, between about 10° C. and about 20° C. Water such as tap water, distilled water, etc. can be utilized. Also, both hard and soft water can be employed.

When vegetables are sprayed with water and steam, each individual spray of water lasts between about 15 seconds and about 90 seconds, preferably between about 30 seconds and about 60 seconds. The duration of total water spraying is between about 2 minutes and about 20 minutes and preferably between about 2.5 minutes and about 12 minutes. The temperature of the water utilized is not crucial (it may be hot or cold) and can be ambient, for example, between about 10° C. and 20° C. Water such as tap water, distilled water, etc. can be utilized. Also, both hard and soft water can be employed.

The number of cycles of sprays for processing rice according to the present invention, may be between about 3 and about 7. The actual number of cycles of sprays will depend upon the starch content of the rice. Italian rice, for example, has a starch content of between about 85 weight percent and about 87 weight percent and preferably is treated in 5 cycles. American rice, on the other hand, has a starch content of between about 87 weight percent and about 90 weight percent and preferably is treated in 5 or 6 cycles extended spraying and steaming.

The number of cycles of sprays for processing vegetables according to the present invention may be between about 1 and about 12. The actual number of cycles of sprays will depend upon the vegetable processed and more particularly on the starch content of the vegetable. For dried potatoes, it is preferred to use about 10 to 11 cycles of sprays. It is preferred to use 10 cycles of sprays for peas and corn and 5 cycles of sprays for dried carrots.

For fresh vegetables which have a water content by weight of about 75% to 95%, spraying with water is not generally required. Fresh vegetables need generally only be sprayed with steam. Such steam may be sprayed in one cycle for a duration of between about 20 and about 25 minutes.

Steam treating time during spraying is dependent upon the depth of the vegetable layer being contacted. The less the depth, the less treating time required. It must be noted that during steaming of dried vegetables, the depth may increase due to swelling.

The cross-sectional area of the vegetable pieces will also influence the steam treating time. Cross-sectional areas greater than 100 mm$^2$ would require longer treating times.

The spraying of the rice can be accomplished by using alternate separate sprays of water and steam, or with wet steam.

The steam utilized when processing either rice or vegetable pieces should have a pressure of between about 3.8 kg/cm$^2$ and about 6 kg/cm$^2$, with a corresponding temperature of between about 135° C. and about 160° C. Each individual spray of steam lasts between about 0.5 minutes and about 4 minutes, and preferably between about 1 minute and about 3 minutes.

A typical scheme for spraying water and steam on rice is as follows: First, water is sprayed onto the rice for between about 10 seconds and about 30 seconds (such as about 15 seconds), followed by a steam spray for between about 0.25 minute and about 3 minutes (such as about 2 minutes). This cycle for spraying water and steam onto the rice is repeated up to about 7 cycles, depending on the type of rice utilized, the duration of the sprays, the temperature of the sprays, etc. until the rice is completely gelatinized.

The total contact time during the intermittent spraying of the rice with the steam and water is between about 2 minutes and about 26 minutes, preferably between about 2 minutes and about 20 minutes, and more preferably between about 3 minutes and about 17 minutes. It is preferred to conduct the spraying of the rice with water and steam with the rice on a moving perforated bed or belt such that the sprays can contact the rice from either above or below the rice, or both above and below the rice. It is preferred that the rice layer on the belt or bed be between about 3 millimeters and about 10 millimeters, and more preferably between about 5 millimeters and about 7 millimeters in depth. The spraying can be conducted in a closed chamber to avoid contamination.

The rice or vegetables pieces may also be sprayed by using alternate pulses of water, steam and heat. In this instance, the rice or vegetable pieces would be alternately sprayed with water and steam, then heated, then sprayed with water and steam, then heated, and so on for a number of cycles of water-steam spraying and heating.

A typical scheme for spraying water and steam is as follows: first, water is sprayed onto the vegetable for between about 30 seconds and about 60 seconds, followed by a steam spray for between about 0.25 minutes and about 4 minutes such as about 2 minutes. This cycle for spraying water and steam onto the vegetable is repeated a number of times, depending on the type of vegetable utilized, the duration of the sprays, the temperature of the sprays, etc. until the vegetable is substantially completely gelatinized.

The total contact time during the intermittent spraying of the vegetables with the steam and water is approximately between about 5 minutes and about 50 minutes, preferably between about 7 minutes and about 40 minutes, and more preferably between about 8 minutes and about 30 minutes.

It is preferred to carry out the spraying of the rice or vegetable pieces as the rice or vegetable pieces moves on a perforated bed or belt so that the sprays can contact the rice or vegetable pieces from either above or below the rice or vegetable pieces, or both above and below the rice or vegetable pieces.

It is preferred that a vegetable layer on the bed or belt initially be between about 30 mm and about 90 mm high, and more preferably between about 40 mm and about 80 mm in height. When considering the height of the vegetable layer on the bed, one has to weigh the production capacity of the processing equipment against the amount of energy required during processing. Such height would also depend on the kind of vegetable being processed.

The spraying of the rice or vegetable pieces can be conducted in a closed chamber to avoid contamination.

Gelatinization may be carried out to completion while the rice or vegetable pieces are being sprayed. In rare instances, gelatinization may extend to completion to a small extent in a subsequent drying operation. However, it is preferred and contemplated that all of the gelatinization occur during spraying.

The total amount of moisture imparted to the rice or vegetable pieces depends on several variables including the nature and type of the rice or vegetable pieces, the pressure and temperature of the steam, the temperature of the water, the time of treatment (contact time) and the weight and surface area of the rice or vegetable pieces being contacted. The time for obtaining complete gelatinization depends, among other variables, on the rice or vegetable quality, such as, for example, its carbohydrate content.

Steam treating time during spraying is dependent upon the height of the rice layer being contacted. The less the height, the less treating time required. During steaming the rice height may increase due to swelling.

After the spraying the rice with water and steam, with the rice now being completely gelatinized and having a moisture content of between about 24 weight percent and about 78 weight percent, such as approximately 70 weight percent, and at a temperature of between about 79° C. and about 100° C., such as approximately 90° C., the rice while still hot, is dried.

After spraying the vegetable with water and steam, with the vegetable now being completely gelatinized and having a moisture content of between about 50 weight percent and 97 weight percent, such as approximately 75 weight percent, and at a temperature of between about 72° C. and about 110° C., such as approximately 90° C.

Such drying can be accomplished by transferring the rice or vegetable pieces on a moving bed to a drying section. It is important that when the rice is handled between the spraying and drying steps that the rice not be stirred or agitated so as to prevent a sticky mass from forming. Avoidance of agitation during the spraying and drying steps may be important for certain vegetables, especially when starchy vegetables are treated.

Agitation would not be such a problem for vegetables such as, for example, carrots, beets and turnips which do not have a relatively high starch content.

During the drying step, the gelatinized rice is reduced to final moisture content of between about 10 weight percent and about 14 weight percent.

During the drying step, the gelatinized vegetable is reduced to a final moisture content of between about 5 weight percent and about 15 weight percent.

It is preferred that the drying be carried out in two steps namely, a predrying step and a final drying step. For rice, a predrying step involves reducing the moisture content to between about 25 weight percent and about 35 weight percent and a final drying step involves reducing the moisture content to between about 10 weight percent and about 14 weight percent. Thus, a predrying section could be operated at a temperature between about 100° C. and about 140° C. with a duration of drying of between about 2 minutes and about 3 minutes. The final drying section could be operated at a temperature of between about 50° C. and about 70° C. and for a duration of drying of between about 20 minutes and about 30 minutes.

For vegetables, a predrying step involves reducing the vegetable moisture content to between about 20 weight percent and about 30 weight percent and a final drying step involves reducing the moisture content to between about 5 weight percent and about 15 weight percent. Thus, the predrying section is operated at a temperature between about 80° C. and about 140° C. with a duration of drying of between about 5 minutes and about 15 minutes. Predrying can for some vegetables, however, require as much as an hour. It is preferred that predrying be conducted for about 8 minutes. The final drying section is operated at a temperature of between about 50° C. and about 110° C. and for a duration of drying of between about 25 minutes and about 75 minutes, with the preferred duration being about 50 minutes.

Drying of either rice or vegetables can be carried out in any convenient manner such as in a drying tunnel. Methods to conduct this drying include the use of hot air, indirect heat exchangers (steam heat exchangers), microwaves, electric resistance heating, fired heaters, etc. During drying, efforts should be made to avoid case hardening of the rice or vegetable pieces.

If hot air is utilized, the optimum velocity of air during the predrying stage is about 125 meters per minute, with a range of between about 100 and about 140 meters per minute. In the final drying stage, the optimum velocity is about 90 meters per minute with a range of between about 75 and about 110 meters per minute. After drying, the rice or vegetable may pass into a tempering (cooling) section. In the tempering section, cool air at between about 25° C. and about 30° C. can be employed. After tempering, the finished quick cooking rice or vegetable is then ready to be sent for packing or storage.

Some conventional processes blanch vegetables with steam or water. Blanching a vegetable involves destroying enzymes near the skin. Such enzymes if left intact might adversely effect the quality of the product during subsequent cooking. Blanching also serves to remove traces of foreign matter which might detract from the flavor. In the present invention, the attributes of blanching are imparted to the product without blanching being required.

The process of the present invention yields a more nutritional product when fresh, rather than dry, vegetables are used. The amount of starch in the final product using fresh vegetables would be about 20% higher as opposed to utilizing dried vegetables.

Figures 1, 2:
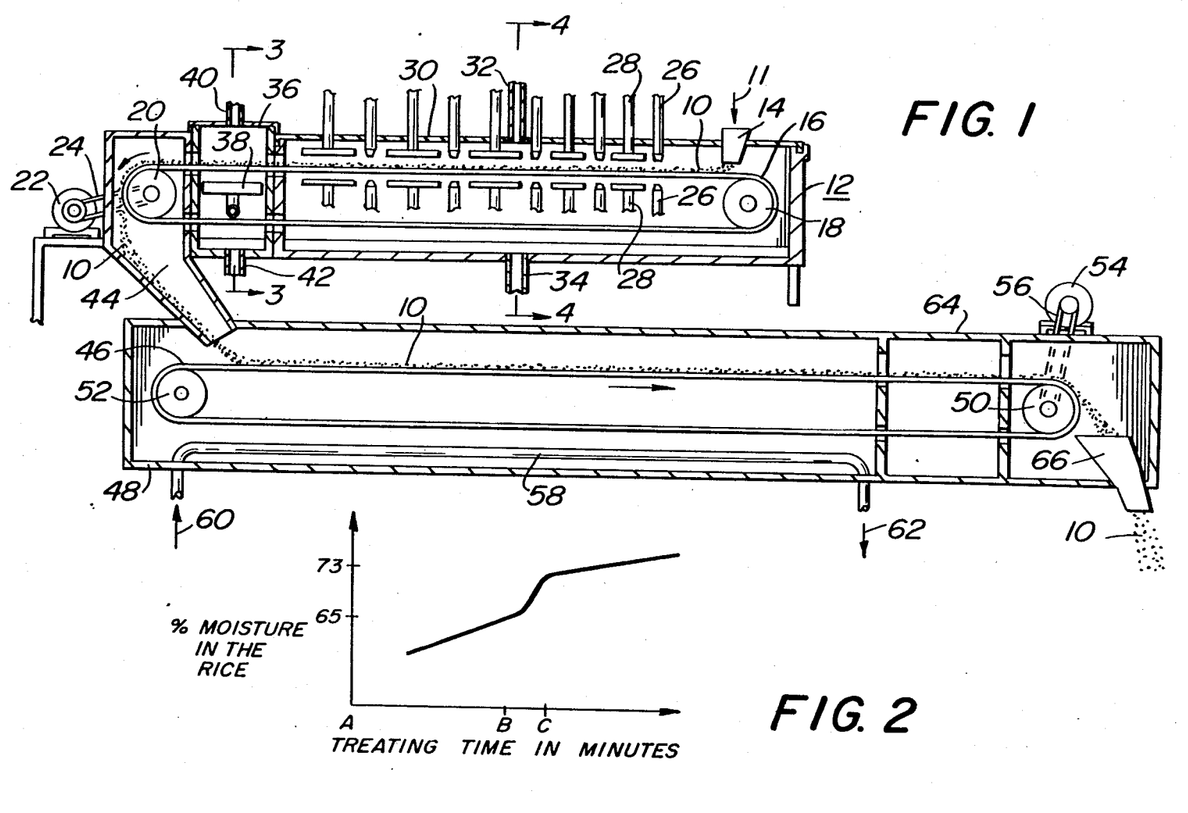
FIG. 1 is a sectional view of an embodiment of an apparatus for conducting the continuous quick cooking processes of the present invention.
FIG. 2 is a plot of treating time to obtain complete gelatinization of rice as a function of the weight percentage of moisture in the rice.

Now referring to FIG. 1 in detail in which like parts are designated by like reference numerals, unpreheated or preheated rice or vegetable pieces schematically represented by numeral 10, enter an apparatus 12 for producing quick cooking rice and vegetables via a hopper 14. Arrow 11 shows the entry point. The hopper 14 deposits the rice or vegetable pieces 10 onto a perforated stainless steel conveyor belt 16. The conveyor belt 16 moves on wheels 18, 20. An electric motor 22 connected to a belt 24 drives wheel 20 to turn conveyor belt 16.

While moving on conveyor belt 16, the rice or vegetable pieces 10 are are alternately contacted with water from sprayers 26 and steam from sprayers 28 located both above and below the conveyor belt 16 in gelatinizing section 30. In the case of fresh vegetables, only steam sprayers 28 would be utilized. Vent 32 in the upper wall of gelatinizing section 30 allows for the exhaust of steam. Drain 34 in the bottom wall of gelatinizing section 30 allows for water drainage.

After being contacted with water and steam, the rice or vegetable pieces 10 then move into a predryer section 36. Hot air is distributed in the predryer section 30 by gas distributor 38. Vent 40 in the top wall of the drying section 36 allows for the exhaust of hot gases. Drain 42 in the bottom wall of the drying section 36 allows for the discharge of condensate.

After being predried, the rice or vegetable pieces 10 pass through through a hopper 44 and are deposited onto a conveyor belt 46 in a drying tunnel 48. Conveyor belt 46 moves on wheels 50, 52. An electric motor 54 connected to a belt 56 drives wheel 50 to turn the conveyor belt 46. Although not so illustrated, the drying tunnel 48 may include several drying sections with each section heated by a separate source of heat, such as by the illustrated indirect heat exchanger 58. In heat exchanger 58, steam or hot water flows in at 60 and out at 62.

The last section of the drying tunnel 48 is a cooling section 64. The rice or vegetable pieces 10 are discharged from the cooling section 64 at outlet 66. The finished processed quick cooking rice or vegetable 10 is then ready to be transported for packing and/or storage.

Figure 3:
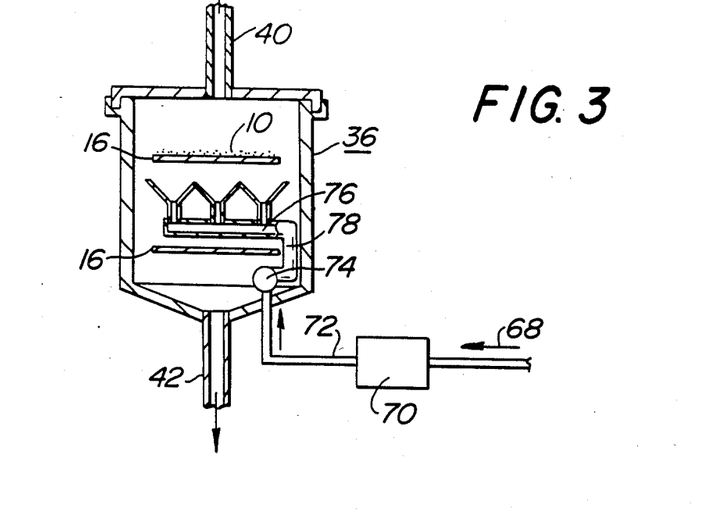
FIG. 3 is a sectional view taken along the line 3—3 of FIG. 1 showing the predrying section of the apparatus depicted in FIG. 1.

FIG. 3 illustrates the predrying section 36 in detail. Ambient air 68 enters an air fan 70 and is directed via conduit 72 to a heater 74, such as, for example, an electric resistance heater or heat exchanger. Hot air from heater 74 is then directed to a distributor 76 via conduit 78. The distributor 76 is disposed under the rice or vegetables 10 on conveyor belt 16.

Figure 4:
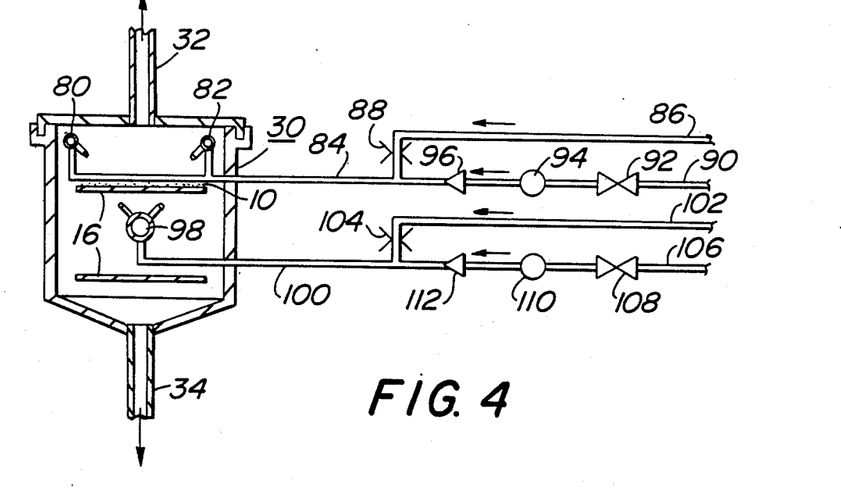
FIG. 4 is a sectional view taken along the line 4—4 of FIG. 1 showing the gelatinization section of the apparatus depicted in FIG. 1.

FIG. 4 illustrates the gelatinization section 30 in detail. Spray nozzles 80, 82 which are disposed above the rice or vegetable pieces 10 on conveyor belt 16 receive water and/or steam via conduit 84. Steam flows into conduit 84 via conduit 86. The flow of steam in conduit 86 is controlled by valve 88. Water flows into conduit 84 via conduit 90. The flow of water in conduit 90 is controlled by valve 92 and is measured by flow device 94. Check valve 96 prevents the steam from conduit 86 entering into water conduit 90.

Spray nozzle 98 which is disposed below the rice or vegetable pieces 10 on conveyor belt 16 receives water and/or steam via conduit 100. Steam flows into conduit 100 via conduit 102. The flow of steam in conduit 102 is controlled by valve 104. Water flows into conduit 100 via conduit 106. The flow of water in conduit 106 is controlled by valve 108 and is measured by flow device 110. Check valve 112 prevents steam from conduit 102 entering into water conduit 106.

With respect to the capacity of the continuous instantizing equipment when vegetables are processed, it is believed that the capacity will be reduced compared to the processing of rice. The reason for this reduction in capacity is that vegetables have a different carbohydrate composition than rice and therefore require longer processing time for obtaining comparable results. Generally, in instantizing vegetables, the capacity is reduced by 20% to 30% with respect to rice. For example, the loading on the belt for potatoes or peas is generally 65% to 80% with respect to processing rice.

The present invention is very advantageous in that a superior quick cooking rice or vegetable product is obtainable. The rice or vegetable product produced does not require conventional cooking in boiling water for a long period of time to be suitable for consumption. The rice or vegetable product produced by the present process requires only a few minutes (3 to 5 minutes) swelling time in hot water before it can be served. Furthermore, the rice or vegetable product obtained by the present process is more nutritious than that obtained by prior art processes in that most of the proteins, minerals, fatty materials and starches in the rice or vegetables are retained therein and not lost during processing. In conventional processes where a relatively long cooking time is required, these valuable nutrients dissolve into the cooking water and are lost.

As compared to prior art instant rice or vegetable processes, the process of the present invention has the advantages of consuming less time, energy and labor. Also, the present process is less polluting than conventional processes and is more economical to operate.

The invention will now be described in greater detail by reference to the following specific, non-limiting examples.

EXAMPLES 1-3

A layer of rice supported on a perforated steel bottom of an uninsulated chamber was contacted with wet steam. Such wet steam was sprayed through orifices located both above and beneath the rice bed.

After the rice was sprayed with wet steam, the rice was dried by predrying the hot material at 120° C. for 1-2 minutes. The rice was then gently turned and afterdried at 60°-65° C. for about 10-30 minutes. To prevent formation of a sticky mass, excess water had to be quickly removed. To accomplish such drying, high velocity air at about 100 meters/minute was employed. Conditions for Examples 1-3 are given in Table 1 hereinafter. The results for Examples 1-3 were good. In each example, the rice was completely gelatinized.

Determination of the water content of the finished dry rice product was accomplished by using a Sauter balance with an infrared lamp located about the balance pan in a manner well known to those skilled in the art. A 10 gram sample of the rice was measured on the balance and then the lamp was turned on for a period of about 10 minutes. After the 10 minute period, the sample was reweighed and the difference in weight represented the loss of water.

TABLE 1

| Ex. No. | Area of Treatment, m² | Steam Pressure kg/cm² | Rice Utilized Type | Amount, kg | Rate of Water Mixed With The Steam, liter/min. | Total Duration of Steaming, min. | Temp. of Channel, °C. | Amount of Moisture Imparted To the Rice, liters |
|---|---|---|---|---|---|---|---|---|
| 1 | 0.19 | 5 | 3 min. rice* | 0.8 | 0.25 | 4 | 92 | 1.0* |
| 2 | 0.19 | 5 | parboiled | 1.1 | 0.25 | 10 | 90 | 2.5** |
| 3 | 0.30 | 3.8 | 3 min. rice | 1.2 | via top orifice: 5 via bottom orifice: 10 | 6 | 93 | 30** |

*"3 min" or "10 min" rice referred to in this Table and elsewhere herein means rice that is heated so it requires 3 minutes (or 10 minutes) boiling time for consumption.
**Not including some condensed water from the steam

EXAMPLES 4-15

A pilot apparatus similar in principle to the process equipment depicted in FIG. 1 was utilized in Examples 4-15. In Examples 4-15, separate sprays of water and steam were sprayed alternately and progressively from separate orifices onto the rice.

In Examples 5-9, the gelatinized rice before drying was found to have a moisture content of between about 65 and 70 weight percent. In Examples 10-12, the moisture content of the rice after gelatinization varied between 62% and 70%. In Examples 13-15, the moisture content of the rice after gelatinization varied between 63% and 70%. Gelatinization conditions for Examples 4-15 are given in Table 2 hereinafter. Table 3 hereinafter gives the predrying and afterdrying conditions and results for Examples 4-15.

In Examples 13-15, untreated rice was used as a starting material, i.e., ordinary, dehulled white rice which was not preheated. Examples 13-15 clearly show that the process of this invention also works well with this type of rice, but the process time is longer and the loss of starchy material is greater.

It was found that the time for obtaining complete gelatinization depends on the rice quality, among other variables. FIG. 2 is a plot of treating time to achieve complete gelatinization as a function of the weight percentage of moisture in the rice. Referring to FIG. 2, the time required from point A to point B and from point B to point C for various types of rice, providing that a constant temperature is maintained of between about 90° C. and about 93° C., is as follows:

| Rice quality | A to B (approximate time in minutes) | B to C (approximate time in minutes) |
|---|---|---|
| Untreated rice | 11 | 2-3 |

-continued

| Rice quality | A to B (approximate time in minutes) | B to C (approximate time in minutes) |
|---|---|---|
| 3 minute rice | 3 | 1 |
| 10 minute rice | 6 | 1 |
| Parboiled rice | 11 | 1 |

If the treating time is extended beyond point C, the rice will be destroyed, thus losing its form and consistency.

The steam treating time is also dependent on the depth of the rice layer on the perforated bed. In Examples 4–15, the depth was 5 mm, which increased to 25 mm during the gelatinization process. This was due to swelling of the rice grains.

Although rice of any quality may be used in the novel process of this invention, the best results were achieved by using 3 minute rice, since the steam quickly penetrated the outer layer and started the gelatinization in the interior of the rice grain. Three minute rice also required the shortest steaming time. The most chewy and temperature stable product, however, was obtained by using ordinary dehulled white long grain rice which was not preheated.

TABLE 2

| Example No. | Area of Treatment, m$^2$ | Steam Pressure, kg/cm$^2$ | Rice Utilized Type | Rice Utilized Amount, kg | Rate of Water Utilized, liters/min. |
|---|---|---|---|---|---|
| 4* | 0.3 | 3.8 | 3 min. rice | 3.0 | 5 |
| 5 | 0.3 | 4.0 | 3 min. rice | 3.0 | 4.8 |
| 6 | 0.3 | 4.0 | 3 min. rice | 3.0 | 4.8 |
| 7 | 0.3 | 4.0 | 3 min. rice | 3.0 | 4.8 |
| 8 | 0.3 | 4.0 | 3 min. rice | 3.0 | 4.8 |
| 9 | 0.3 | 4.0 | 3 min. rice | 3.0 | 4.8 |
| 10 | 0.3 | 4.0 | 10 min. rice | 3.0 | 4.8 |
| 11 | 0.3 | 4.0 | 10 min. rice | 3.0 | 4.8 |
| 12 | 0.3 | 4.0 | 10 min. rice | 3.0 | 4.8 |
| 13 | 0.3 | 4.0 | untreated rice | 3.0 | 4.8 |
| 14 | 0.3 | 4.0 | untreated rice | 3.0 | 4.8 |
| 15 | 0.3 | 4.0 | untreated rice | 3.0 | 4.8 |

| Example No. | Water Sprays No. of Sprays | Water Sprays Duration of Each Spray, min. | Water Sprays Total Duration of Spraying, min. | Steam Sprays No. of Sprays | Steam Sprays Duration of Each Spray, min. | Steam Sprays Total Duration of Spraying, min. | Temp. of Channel °C. | Gelatinization |
|---|---|---|---|---|---|---|---|---|
| 4* | 5 | 1/2 | 2 1/2 | 5 | 1 | 5 | 94 | Not completely gelatinized, some crispy fragments |
| 5 | 5 | 1/4 | 1 1/4 | 2 / 3 | 1 / 2 | 8 | 98–100 | Very Good |
| 6 | 5 | 1/4 | 1 1/4 | 2 / 3 | 1 / 2 | 8 | 98–100 | Very Good |
| 7 | 5 | 1/4 | 1 1/4 | 2 / 3 | 1 / 2 | 8 | 98–100 | Satisfactory |
| 8 | 5 | 1/4 | 1 1/4 | 2 / 3 | 1 / 2** | 8 | 98–100 | Satisfactory |
| 9 | 6 | 1/4 | 1 1/2 | 2 / 4 | 1 / 2 | 10 | 98–100 | Gelatinization seemed to go too far |
| 10 | 7 | 1/4 | 1 3/4 | 2 / 5 | 1 / 2 | 12 | 98–100 | Good (5 sequences were not sufficient) |
| 11 | 5 | 1/4 | 1 1/4 | 2 / 3 | 1.25 / 2.5 | 10 | 98–100 | Satisfactory |
| 12 | 5 | 1/4 | 1 1/4 | 2 / 3 | 1.25 / 2.5 | 10 | 70–85 | Not satisfactory - trouble with the steam |
| 13 | 6 | 1/4 | 1 1/2 | 2 / 4 | 1.25 / 2.5 | 12.5 | 98–100 | Rice was hard after 5 sequences - gelatinization was satisfactory after an additional sequence |
| 14 | 6 | 1/4 | 1 1/2 | 2 / 4 | 1.25 / 2.5 | 12.5 | 98–100 | Satisfactory |
| 15 | 6 | 1/4 | 1 1/2 | 2 / 4 | 1.5 / 3 | 15 | 98–100 | Satisfactory |

*Amount of water added to the rice was 12.5 liters, not including some condensed water from the steam.
**Rice was sprayed with cold water immediately after the last steaming - cold water had no effect on gelatinization.

TABLE 3

| Ex. No. | Pre-Drying Conditions | | | After-Drying Conditions | | | Remarks |
|---|---|---|---|---|---|---|---|
| | Air Velocity, m/min. | Temp., °C. | Duration, min. | Air Velocity, m/min. | Temp., °C. | Duration, min. | |
| 4 | 125 | 114 | 4 | 90 | 55 | 21 | Good results were obtained |
| 5 | 125 | 110 | 1½ | 90 | 53 | 25 | Case hardening had occurred and the grains had a hard shell with a soft kernel. |
| 6 | 125 | 100 | 2½ | 90 | 55 | 25 | The product was not perfectly dry. |
| 7 | 125 | 100 | 2½ | 90 | 55 | 25 | Very good. The rice agglomerates could be broken apart into separate grains very easily. A sample was prepared by swelling in hot water for 5 minutes. The rice was well cooked and the consistency was nice and soft without any hard fragments in the grains. |
| 8 | 125 | 100 | 3 | 90 | 70 | 25 | Very good. Exactly the same result as in Example No. 7. |
| 9 | 125 | 110 | 3 | 90 | 70 | 25 | The product was satisfactory dried and the agglomerates were easily broken apart into separate grains. A sample which was prepared for eating by swelling in hot water was too soft. The gelatinization process had gone too far. |
| 10 | 125* | 115 | 3 | 90 | 70 | 25 | The product was not satisfactory dried and the drying had to continue for another 3 minutes. Still, the product was not as dry as desired and it was almost completely impossible to break up the agglomerates. |
| 11 | 125 | 108 | 3 | 90 | 70 | 25 | Very good. The rice agglomerates could easily be broken apart to single grains. A sample was prepared for eating by swelling in hot water for 5 minutes. The grains had a firm and nice consistency without any hard zones and were more chewy than that from "3 minute rice". This is the way this kind of rice should be. |
| 12 | 125 | 110 | 2 | 90 | 70 | 26 | The product was satisfactory dry but the grains had crispy zones because of unsatisfactory gelatinization. |
| 13 | 125 | 110 | 2 | 90 | 70 | 26 | Although the product was not perfectly dry, the result was promising. |
| 14 | 125 | 120 | 2 | 90 | 70 | 30 | The product was sufficiently dry and the rice agglomerates could easily be broken apart. A sample was prepared for eating by swelling the rice in hot water for 5 minutes. The grains had some crispy zones which indicted that the gelatinization process was not completed. |
| 15 | 125 | 108 | 2 | 90 | 70 | 30 | The product was satisfactorily dry and the aggolomerates could quite easily be broken up. A sample was prepared for eating by swelling in hot water for 5 minutes. The rice was firm and nice and probably still more chewy than that from the "10 minute rice". The result was very good. |

*Rice was sprayed with water before drying

EXAMPLES 16-29

Examples 16-20 were directed to carrots; Examples 21-26 were directed to potatoes; Examples 27-28 were directed to green peas; and Example 29 was directed to corn.

Some examples were specifically directed to treating dried vegetables, such as dried carrots (Examples 16-19), dried potatoes (Examples 21-22), dried green peas (Examples 27-28) and dried corn (Example 29). Other examples were specifically directed to the treatment of fresh vegetables such as fresh carrots (Example 20) and fresh potatoes (Examples 23-26).

The dried treated vegetables were cut into 10 mm × 10 mm × 10 mm pieces. Prior to treating, the fresh potatoes and carrots were washed, cleaned, peeled and mechanically cut in pieces of 8 mm × 8 mm × 3 mm, or 10 mm × 10 mm × 10 mm.

In Examples 16-29, the raw vegetable material was loaded on a perforated steel belt and conveyed through a channel where it passes several alternating zones for water spraying and steaming. The cycles varied between 4 and 6 (the broadest range of cycles was 1 to 12) depending on the quality and type of material. Fresh vegetables were not sprayed with water, only with steam, as they naturally contain 75%-90% moisture. The dried green peas were soaked in water overnight before they were processed in the above-described apparatus. The reason for soaking the peas was to save time, capacity and energy in the process. If the soaking had been omitted, the process probably required about 10 to 15 water/steam cycles.

After the vegetables had been satisfactory gelatinized, they were directly and continuously conveyed to drying sections in a drying channel. There the vegetables passed through zones for predrying, final drying and cooling. At the end of each experiment, the vegetables were reconstituted (cooked) by soaking them for 3 to 5 minutes in hot water which previously had been heated to boiling and removed from a hot plate.

Determination of the water content of the finished dry vegetable product was accomplished by using a Sauter balance with an infrared lamp located above the balance pan in a manner well known to those skilled in the art. A 10 gram sample of the vegetable was measured on the balance and then the lamp was turned on for a period of about 10 minutes. After the 10 minute period, the sample was reweighed and the difference in weight represented the loss of water.

The main parameters in the processing apparatus were as follows:

| | |
|---|---|
| Pressure in the gelatinizing/drying channel | Atmospheric |
| Temperature in the steam channel | 100° C. |

-continued

| | |
|---|---|
| Pressure in the steam tube | 6 kg/cm² |
| Rate of cold water spraying | 5 liters/min. |
| Diameter of the holes in the steel belt | 2.5 mm |
| Velocity of the air during | |
| predrying | 125 m/min. |
| maximum range | 100–140 m/min. |
| Velocity of the air during | |
| final drying | 90 m/min. |
| maximum range | 75–100 m/min. |

The results for Examples 16–29 are given in the description of the individual Examples that follow and in Table 4 following the Examples.

It was found that the vegetable products obtained in this continuous process had a higher nutrition value compared to materials instantized in conventional batchwise methods. Thus, the carbohydrate content was about 15% to 20% higher and the contents of vitamins and minerals were 30% to 50% higher as compared to vegetables produced by conventional processes. Because the process was operated continuously at a relatively high constant temperature, the effluent problem normally associated with prior art processes was negligible. All vegetables prepared in these examples were ready for serving after being soaked in hot water for about 3 to 5 minutes. Besides the very short cooking time necessary to prepare the vegetables according to this invention, the "shelf-life" (freshness) of the vegetables was superior when compared to conventionally prepared vegetables, no peeling was necessary, no waste occurred and the products weighed less because water was removed which made them easier to transport.

The process was operated at a relatively high temperature to prevent the formation of condensed water which would by the nature of the process contain starchy material. Such starch containing water would in turn cause an effluent disposal problem.

Apart from the peas, the best results were obtained by using fresh raw vegetables, although dried vegetables also gave acceptable results. The fresh raw vegetables had the best visual and organoleptic qualities. The examples support my reasonable belief that this method also can be applied to other kinds of vegetables, such as, for example, celery, cabbage, leak, sweed, parsley, etc. Since these vegetables have almost the same carbohydrate configuration as carrots, they should work well with this invention.

EXAMPLES 16–20 (Carrots)

Examples 16–19

Examples 16–19 concerned the treatment of dried carrots cut in 10 mm × 10 mm × 10 mm pieces. Examples 16–19 were directed to treating carrot pieces that were not soaked prior to being treated. After the drying process, the sides of the carrot pieces had a concave and wrinkled appearance. This drawback was not removed by reconstitution in hot water after the carrots were processed according to the present invention, not even after swelling the carrots in hot water for 30 minutes. The carrot product was not dry after final drying for 30 minutes. The carrot product had a tendency to case harden that prevented the moisture from the interior of the carrot pieces to penetrate and disappear. The taste of the product was not very distinct, but the consistency was fairly good.

In Example 19, dry raw carrots were soaked in water overnight before processing. After soaking, these pieces had a good appearance. Because of the high moisture absorption (the weight had increased by 300%), it was not necessary to spray the carrots with water during the instantizing process. After being dried, the carrots were brittle and reconstitution in hot water for 5 minutes gave a fairly good product that had a better taste than previous products. The pieces still had, however, a wrinkled appearance. They were not satisfactory. The taste was still weak, but the consistency and color were good.

Example 20

In this example, fresh carrots were used as the raw material. The size of the fresh carrot pieces was 8 mm × 8 mm × 3 mm. The processed carrot product had a delicate appearance. After being reconstituted in hot water for about 5 minutes, the carrot product had a very pleasing color and appearance, a good taste and a very good consistency. The result was in fact very good. The weight of the carrots was reduced during the steaming operation. This is always the case with fresh raw materials, because some of the cells rupture and water is pressed out of the material and is lost.

Because of the low content of free starch in carrots, there was no problem with pieces sticking together during drying.

EXAMPLES 21–26 (Potatoes)

Examples 21 and 22 dealt with dried potatoes of size 10 mm × 10 mm × 10 mm. The processed product had an excellent taste after being swelled in hot water for 5 minutes, but the appearance was not satisfactory. In spite of the fact that extra water was added during the gelatinization process, the pieces were still wrinkled.

Example 21

The processed potato product when reconstituted in hot water for 5 minutes had some hard pieces, some of which had brown spots due to too intense heat during drying.

Example 22

The reconstituted potato product was better than the product of Example 21, but the appearance was not good enough.

Examples 23–26

Examples 23–26 concerned the treatment of fresh potatoes. In preparing this material, the potatoes were washed, peeled and mechanically cut into pieces of two different sizes, namely, 8 mm × 8 mm × 3 mm and 10 mm × 10 mm × 10 mm. Ready prepared raw potatoes which would not be processed at once were stored by covering the potatoes with water to prevent the effect of the Maillard reaction (browning reaction). Because of their high content of free starch, the potatoes had a greater tendency to cling together in the drying process than the carrots. This tendency was considerably reduced by spraying the material with cold water between gelatinization and drying. The potato pieces still stuck together but they were very easy to separate. The potato product had a light and delicate appearance and was ready for serving after being soaked in hot water for 5 minutes. Taste, color, appearance and consistency were excellent. The potatoes of both sizes gave the same good result.

In Example 23, fresh raw potatoes of a cut size of 8 mm×8 mm×3 mm were used. After soaking the processed potatoes in hot water for 5 minutes, the product was ready for serving. The potatoes had a light, delicate appearance and a fine consistency. No brown spots were observed.

In Example 24, fresh potatoes were cut into pieces of 10 mm×10 mm×10 mm. The gelatinized potatoes were predried for 6 minutes in hot air (at 80° C.) of high velocity to prevent case hardening. Some of the processed potato pieces turned brown due to extending the final drying too long. However, a very good potato product was obtained after the potato pieces were swelled in hot water for 3 minutes. The appearance, taste and consistency of most pieces were generally excellent.

Example 25 involved ascertaining the effect of cold water spraying between steaming and drying. The dried potato pieces still stuck together after a cold water spray, but were easy to separate. The result was like that of Example 24.

Fresh raw potatoes of size 8 mm×8 mm×3 mm were used in Example 26. The gelatinized potato pieces were sprayed with cold water before drying and the ready made product was very easy to separate. Reconstitution in hot water for 3 minutes gave a very delicate product ready for consumption.

Examples 27–28 (Green Peas)

Examples 27 and 28 concerned treating common air dried green peas. A small test sample showed that it was necessary to soak the peas in cold water overnight before processing. After soaking, the peas were fairly soft, had swelled considerably and their weight had increased by 100%. In spite of the water-soaking, it was necessary to employ water spraying during the gelatinization process. Even though the amount of raw green peas in Example 27 was double the amount in Example 28, it was necessary to apply the same processing time in both examples. A certain puffing effect was obtained both during steaming and predrying. This seemed difficult to avoid if a satisfactory instantized pea product was to be obtained. The peas had no tendency to stick together in the drying process.

The instantized pea products had a delicate appearance. The peas from both Examples 27 and 28 were ready for serving after being swelled in hot water for 3 minutes. The pea products were delicate and had a very good taste, color and consistency. With respect to the required processing time, it seemed important to use peas of about the same size.

Example 29 (Corn)

Example 29 was directed to the treatment of corn. In this example, dried corn of popcorn quality was used. An introductory test showed that it would be necessary to soak the raw corn material in water before processing. Therefore, the raw corn was soaked in water for 72 hours, boiled for 2 hours and then soaked in water for another 15 hours before processing. Neither the steaming nor the drying process had any adverse effect on the corn. After reconstituting in hot water, the corn was just as hard as before processing and was generally unchanged in size and shape.

It is believed that if the process would have been employed on fresh corn, satisfactory results would have been obtained. However, fresh corn was not obtainable at the time when this example was performed.

TABLE 4

| Ex. No. | Vegetable | Dried or Fresh Raw Material | Load On Steel Belt, kg/cm$^2$ | Water Spraying no. × min. | Steaming, no. × min. | Water Spraying Between Gelatin. and Drying | Increase In Wt. During Gelatin. |
|---|---|---|---|---|---|---|---|
| 16 | carrots | dried | 5 | 5 × ½ | 2 × 1<br>3 × 2 | Yes | |
| 17 | carrots | dried | 10 | 5 × 1 | 2 × 1<br>3 × 2 | No | 170% |
| 18 | carrots | dried | 10 | 5 × 1 | 2 × 1<br>3 × 2 | No | |
| 19 | carrots | dried | 44 | No | 10 × 1 | No | 9% |
| 20 | carrots | fresh | 41 | No | 20 × 1 | No | −8% |
| 21 | potatoes | dried | 10 | 6 × 1 | 2 × 1<br>4 × 2 | No | 137% |
| 22 | potatoes | dried | 10 | 11 × 1 | 2 × 1<br>9 × 2 | No | 212% |
| 23 | potatoes | fresh | 25 | No | 9 × 1 | No | 6.5% |
| 24 | potatoes | fresh | 30 | No | 7 × 1 | No | 0 |
| 25 | potatoes | fresh | 3.3 | No | 7 × 1 | Yes | 0 |
| 26 | potatoes | fresh | 30 | No | 5 × 1 | Yes | 0 |
| 27 | green peas | dried | 40 | 10 × 1 | 10 × 3 | No | 8% |
| 28 | green peas | dried | 20 | 10 × 1 | 10 × 3 | No | 8.3% |
| 29 | corn | dried | 24.6 | 10 × 1 | 10 × 4 | No | |

| Ex. No. | Predrying Temp. C° | Predrying Time, mins. | Predrying P, mm H$_2$O | Final Drying Temp. C° | Final Drying Time, mins. | Final Drying P, mm H$_2$O | Humidity in Product | Height of Material On Steel Belt Start, mm | Height of Material On Steel Belt After Gelatin., mm |
|---|---|---|---|---|---|---|---|---|---|
| 16 | 110 | 4 | | 60 | 30 | | 26.3% | | |
| 17 | 110 | 2 | | 80 | 25 | | | | |
| 18 | 120 | 8 | | 90 | 25 | | 24.0 | | |
| 19 | 130 | 8 | 90 | 95 | 50 | 40 | 8.9% | 70 | 90 |
| 20 | 120 | 8 | 140 | 90 | 50 | 40 | 5.83% | 80 | 90 |
| 21 | 120 | 8 | 60 | 85 | 25 | 40 | | | |
| 22 | 120 | 8 | 60 | 90 | 45 | 40 | 9.5% | 35 | 80 |
| 23 | 120 | 8 | 80 | 90 | 50 | 40 | | | |

TABLE 4-continued

| | | | | | | | | | |
|---|---|---|---|---|---|---|---|---|---|
| 24 | 80 | 6 | | 110 | 75 | 80 | 9.3% | 75 | 75 |
| 25 | 85 | 55 | 100 | | | | | | |
| 26 | 80 | 8 | 40 | 80 | 50 | 70 | 7.8% | 75 | 75 |
| 27 | 120 | 8 | 30 | 90 | 50 | 60 | | 80 | 80 |
| 28 | 120 | 8 | 40 | 90 | 30 | 60 | 2.6% | 40 | 40 |
| 29 | 120 | 5 | 80 | 100 | 45 | 20 | | | |

The present invention may be embodied in other specific forms without departing from the spirit or essential attributes thereof and, accordingly, reference should be made to the appended claims, rather than to the foregoing specification, as indicating the scope of the invention.

I claim:

1. A continuous process for producing a quick cooking vegetable comprising:
   (a) spraying moisture and steam on discrete pieces of a vegetable that contains carbohydrates as said vegetable moves along on a conveyor belt until the vegetable attains a moisture content of between about 50 weight percent and about 97 weight percent and a resultant temperature of between about 72° C. and about 110° C. such that the vegetable pieces are completely gelatinized,
   (b) pre-drying the vegetable pieces by hot air at velocities ranging between about 100 m/s and about 140 m/s to a moisture content of between about 20 weight percent and about 30 weight percent, and
   (c) finally drying the vegetable pieces by hot air at velocities ranging between about 75 m/s and about 110 m/s to a final moisture content between about 5 weight percent and about 15 weight percent.

2. A process according to claim 1 wherein the vegetable is a dried vegetable and the spraying includes spraying with water and steam.

3. A process according to claim 1 wherein the temperature of the steam during said spraying is between about 135° C. and about 160° C.

4. A process according to claim 1 wherein the vegetable is a fresh vegetable having a water content of at least about 75%.

5. A continuous process for producing a quick cooking vegetable comprising the following steps:
   (a) placing a layer of discrete pieces of a vegetable that contains carbohydrates onto a peforated conveyor belt within a closed chamber;
   (b) spraying moisture on the vegetable as it moves along on the conveyor belt with alternate sprays of water and steam in separate streams a sufficient number of times to substantially completely gelatinize the vegetables so as to have a moisture content of between about 50 weight percent and about 97 weight percent and a resultant temperature of about 72° C. and about 110° C., said steam having a temperature of between about 135° C. to about 160° C. and a pressure of about 3.8 kg/cm$^2$ to about 6 kg/cm$^2$;
   (c) transferring the gelatinized vegetable while it moves on the conveyor belt to a pre-drying section within the chamber;
   (d) pre-drying the vegetable pieces to a moisture content of between about 20 weight percent and about 30 weight percent; and
   (e) finally drying the gelatinized vegetable to a moisture content of between about 5 weight percent and about 15 weight percent, the vegetables so produced being suitable for consumption after swelling in hot, rather than boiling water for about 5 minutes.

6. A process according to claim 2 wherein the vegetables in step (a) are disposed in a layer having a depth of between about 30 mm and about 90 mm.

* * * * *